Nov. 13, 1956     R. E. PETERSON     2,770,795
ACOUSTIC LOG

Filed March 30, 1951     2 Sheets—Sheet 1

INVENTOR
ROBERT E. PETERSON
BY Elmer J. Gorn
ATTORNEY

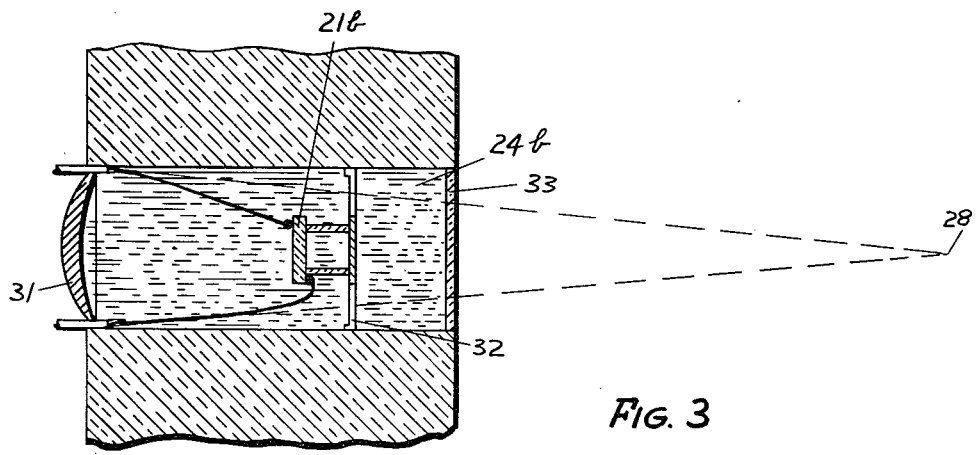
Fig. 3
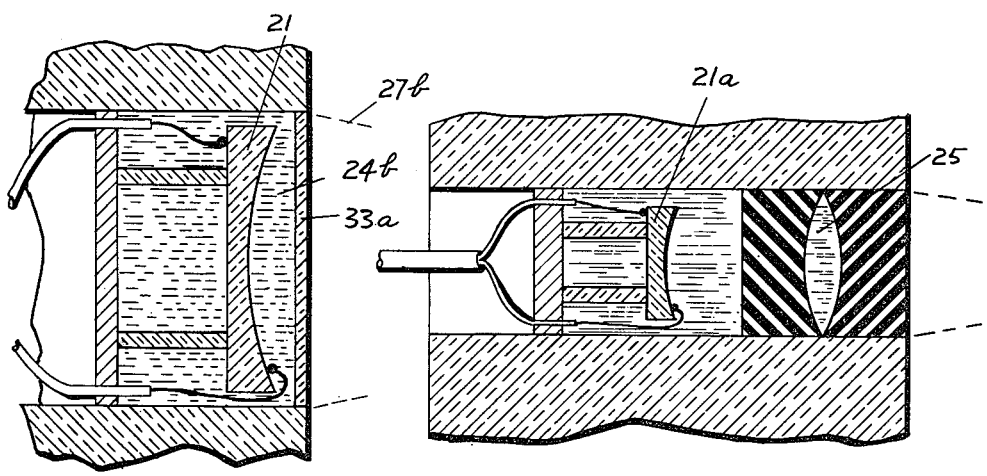
Fig. 4
Fig. 5

United States Patent Office 2,770,795
Patented Nov. 13, 1956

2,770,795
ACOUSTIC LOG

Robert E. Peterson, Old Lyme, Conn., assignor to Raytheon Manufacturing Company, Newton, Mass., a corporation of Delaware Application March 30, 1951, Serial No. 218,463

4 Claims. (Cl. 340—3)

The present invention relates to means for measuring the speed of a vessel's passage through a fluid by means of the doppler effect on reflected compressional wave energy.

It is known that the velocity of a ship traveling through the water may be determined relative to the water by transmitting sonic waves from the ship through the water in a direction parallel to the direction of the motion of the ship, and receiving waves which are reflected back from discontinuities in the water, such as air bubbles, impurities and thermal variations, and beating the frequency of the received waves with that of the transmitted waves. The difference frequency will vary with the velocity of the ship, and therefore the velocity of the ship may be measured in terms of this doppler frequency.

Previously it has been necessary to depend upon the sea bottom or casually occurring discontinuities in the water for the point of reflection. By the present invention the waves are focused on a point in the medium and cause cavitation at that point, from which discontinuity in the fluid medium a higher level of energy is reflected back towards the source where the doppler effect is observed and measured to determine the speed of the vessel.

The focusing of the beam of compressional wave energy is accomplished in the present invention by a conventional transducer with a lens of a material having greater density than water and permitting the passage of compressional wave energy through it at a speed less than that through water. Chloroform, which has almost the same acoustic resistance as water, is such a material and for this purpose is preferably contained in a case having sound transparent windows of the Rho c type of rubber to minimize undesirable discontinuities that might arise from the use of a material between the source of sonic energy and the water of different acoustic resistance than water. The beam can also be concentrated at a forward focal point by forming the contact surface of the transmitting piezo-electric crystal so as to cause a converging beam. A concave ground crystal will cause this effect. The lens may or may not be required in combination with the specially formed crystal to obtain optimum results. The use of a special shape or of a lense for the receiving crystal is not essential to the proper operation of the system and the slight theoretical improvement may not justify practically this design over use of a plane crystal without a lens.

The foregoing and other advantages, objects and features of the invention will be better understood from the following description taken in conjunction with the accompanying drawings, wherein:

Fig. 3 is a detail in section of a modification of the compressional wave energy concentrating means;

Fig. 4 is a detail in section of another modification of the compressional wave energy concentrating means; and Fig. 5 is a detail in section of another modification of the compressional wave energy concentrating means.

Figure 1:
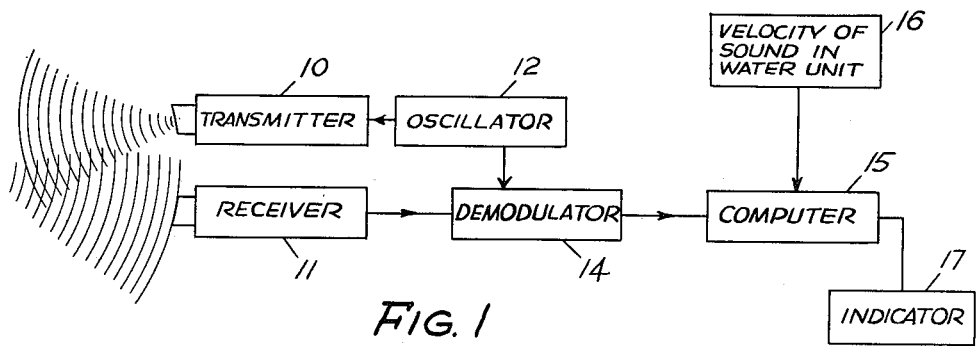
Fig. 1 is a block diagram of an acoustic log in which the invention may be used.

Referring now to Fig. 1, there is shown an apparatus for measuring the velocity of a ship through water comprising a pair of transducers 10 and 11, transducer 10 being a transmitting transducer, and transducer 11 being a receiving transducer. By way of example, there is shown a source of signals comprising a one megacycle crystal oscillator 12 continuously excited and fed to the transmitting transducer 10. Ultrasonic signals emitted from transducer 10 are concentrated by a lens system later described to focus at a point from which the energy is reflected back and picked up by the receiving transducer 11. The signals are fed from the transducer 11 to a demodulator 14. This demodulator is most conveniently a mixer where the transmitted and received signals are mixed to produce the difference frequency which is then measured by the computer 15 that may be a frequency measuring bridge circuit. The doppler frequency, and consequently the accuracy of speed indicated, is affected by the temperature, salinity and pressure of the water being sampled. These variables are combined by measuring the velocity of sound in water with a suitable meter designed to provide a proportional voltage. This voltage can be introduced into the computer 15 to provide corrected indications at the indicator 17. The details of this circuitry are no part of the present invention. The present invention may be used with the more elaborate and accurate speed measuring equipment such as that disclosed in the copending application of Norman B. Saunders, Serial No. 164,283, filed May 25, 1950.

Figure 2:
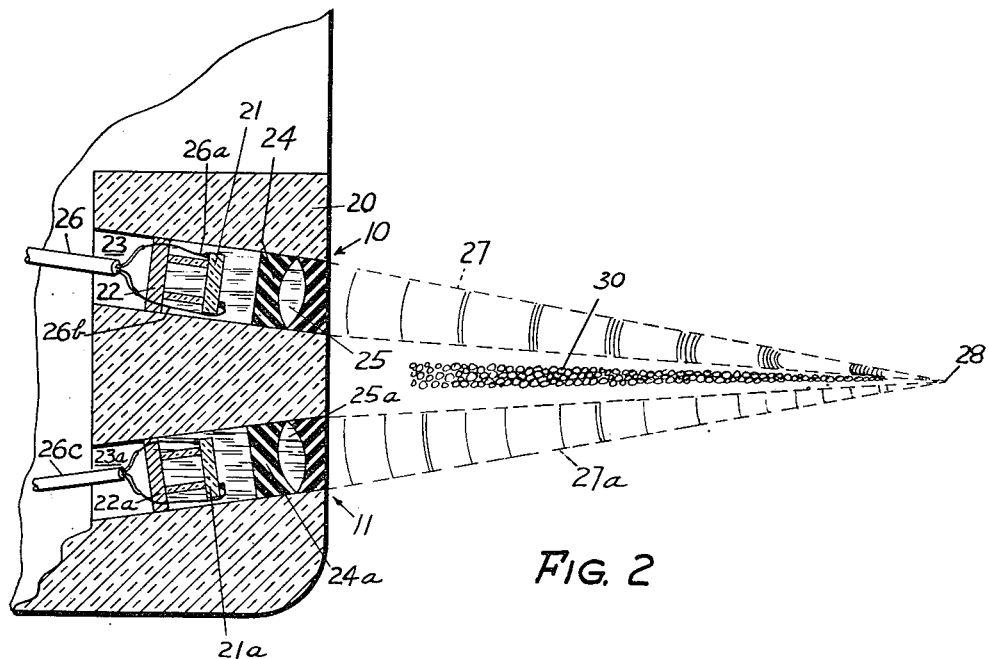
Fig. 2 is a schematic diagram of the preferred embodiment of the invention shown partly in section.

The transducers are shown more in detail in Fig. 2 where the transducers 10 and 11 are shown mounted on a strut 20 of a ship. The transducer crystal 21 is mounted on supports 22 in any appropriate manner in an opening in the strut. The portion of the opening between the crystal 21 and a window 23 is filled with a liquid 24 having the acoustic resistance of water and suitable for use in contact with the crystal. Castor oil is used in the present instance. The window 23 is formed of a sound transparent rubber, such as Rho c rubber having a lens-shaped opening filled with material 25, such as chloroform, that transmits compressional waves at a slower velocity than water. The crystal 21 is connected into the electrical circuit of Fig. 1 by the two wire cable 26 connected to the crystal 21 by electrodes 26a and b. The receiving transducer 11 is constructed substantially the same as the transmitting transducer 10.

In operation the compressional waves produced by the transmitting transducer crystal 21 propagate through the castor oil 24 and the rubber window 23 until they meet the liquid lens 25 where their wave front is slowed up by the varying amounts according to the thickness of the various portions of the lens. The result is a converging beam 27 with the energy successively concentrated until it reaches an intensity at a point 28 such that cavitation takes place. Because of attenuation losses in the water it may be necessary to increase the acoustic output from the crystal in order to produce cavitation or to design the lens for a shorter focal distance, if increasing the output is impractical. The reflecting media 30 formed at this point produces a stationary discontinuity from which the energy is reflected and returns along the beam 27a to the receiving transducer 11 and its lens 25a which distributes the energy evenly over the crystal 21a to create an electrical output in the cable 26c which is utilized by the circuit shown in Fig. 1 to give an indication of the speed of the vessel.

The rubber 23 may be replaced by any other material having approximately the same acoustic impedance as sea water and permitting sound waves to pass through it at approximately the same velocity as does sea water. The lens material can be any material permitting sound waves to pass through it at a lesser velocity than does sea water.

Fig. 3 shows a modification of the compressional wave energy concentrating means in which the lens 25 of Fig. 2 is replaced by a spherical mirror 31 placed behind the crystal 21b. The crystal is mounted on a spider 32 and positioned along the direction of propagation a distance greater than half the radius of the spherical mirror 31 from the surface of the mirror. A thin wall 33 of a sound transparent material separates the transducer from the propagation medium, such as sea water. The space between the wall 33 and the mirror 31 is filled with castor oil 24b or other material having the same acoustic resistance as the medium in which the instrument is to be used, such as sea water. The energy propagated by the crystal 31 is reflected back through the castor oil 24b and the wall 33 into the medium in a converging beam that concentrates at 28 sufficiently to tend to produce cavitation.

Fig. 4 shows how the desired concentration may be produced by forming the crystal 21 with a concave face and discarding the lens 25 of Fig. 2 and substituting for it a wall 33a of sound transparent material. The castor oil 24b is retained in this modification. The concave face of the crystal produces a converging beam of compressional energy 27b that tends to produce cavitation as with the other embodiments.

Fig. 5 shows how the concave surfaced crystal 21a of Fig. 4 can be combined with the lens 25 of Fig. 2 to produce a sharper focus than either the shaped crystal 21a or the lens 25 alone.

It is apparent that the shaped crystal 21a could also be used with the concentrating mirror 31 to produce a sharp point of focus that is more likely to produce cavitation. Other means for concentrating compressional wave energy in a fluid medium will occur to those skilled in the art.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:
1. A speed-measuring device comprising means for generating compressional wave energy, means for transmitting said energy through a fluid in a converging beam to produce cavitation in the region of convergence, means for receiving the energy waves reflected from said region of cavitation, and means for comparing the frequency of said transmitted waves with the frequency of said reflected waves.

2. A speed-measuring device comprising means for generating compressional wave energy, means for transmitting said energy through a fluid in a converging beam to produce cavitation in the region of convergence, said transmitting means comprising a lens positioned in front of the generating means, means for receiving the energy reflected from said region of cavitation, and means for comparing the frequency of said transmitted waves with the frequency of said reflected waves.

3. A speed-measuring device comprising means for generating compressional wave energy, means for transmitting said energy through a fluid in a converged beam to produce cavitation in the region of convergence, said transmitting means comprising a lens positioned in front of the generating means, said lens being of a material permitting compressional wave energy to pass at a lower velocity than in water, means for receiving the energy reflected from said region of cavitation, and means for comparing the frequency of said transmitted waves with the frequency of said reflected waves.

4. A speed-measuring device comprising means for generating compressional wave energy, means for transmitting said energy through a fluid in a converging beam to produce cavitation in the region of convergence, said transmitting means comprising a lens of chloroform contained in Rho c rubber positioned in front of the generating means, means for receiving the energy reflected from said region of cavitation, and means for comparing the frequency of said transmitted waves with the frequency of said reflected waves.

References Cited in the file of this patent
UNITED STATES PATENTS

| | | |
|---|---|---|
| 1,864,638 | Chilowsky | June 28, 1932 |
| 2,448,365 | Gillespie | Aug. 31, 1948 |
| 2,480,646 | Grabau | Aug. 30, 1949 |
| 2,565,159 | Williams | Aug. 31, 1951 |